UNITED STATES PATENT OFFICE.

OTTO CHRISTIAN HAGEMANN, OF LONDON, ENGLAND, ASSIGNOR TO JAMES S. KIRK & CO., OF CHICAGO, ILLINOIS.

RECOVERING GLYCERINE FROM SPENT SOAP-LYE.

SPECIFICATION forming part of Letters Patent No. 453,835, dated June 9, 1891.

Application filed April 22, 1890. Renewed January 12, 1891. Serial No. 377,547. (No specimens.)

*To all whom it may concern:*

Be it known that I, OTTO CHRISTIAN HAGEMANN, of Hillthorpe, Sydenham Hill, London, England, have invented an Improved Process for Treating Spent Soap-Lye for the Purpose of Obtaining Glycerine and other Useful Products Therefrom, of which the following is a specification.

The objects of this invention are to obtain glycerine and other useful products from spent soap-lye.

In carrying out my invention I first treat the spent lye with lime or any other earthy oxide or hydrate capable of combining with soapy or resinous bodies that are contained in the lye by intimately mixing the latter with the finely-divided oxides or hydrates. The quantity of the lime required varies somewhat according to the impurity of the lye. Usually one-half of one per cent. is sufficient. The lime or its equivalents produce an insoluble precipitate, which quickly settles to the bottom of the vessel in which the operation is performed, or may be removed by filtration, and thus the lye is purified from part of the fatty and resinous matters it contained. I next evaporate the lye until it is saturated with salt. The liquid is then removed into another vessel, and hydrochloric or another suitable acid added to the point of neutralization and then subjected to the following treatments, previously, however, having been brought to a temperature of about 30° centigrade or less by cooling. I add to the lye a solution of animal albumen, or animal or vegetable caseine, or any suitable proteine body which can be rendered insoluble by adding to its dilute alkaline or neutral solution a mineral acid in slight excess, or a metal salt of an acid reaction, all in the presence of much sodium chloride, and provided that the mixture may be heated to complete such rendering insoluble of the proteine body. A good proportion is one part of blood albumen to about twelve hundred parts of the liquor, but more is required with very impure lye. I now add to the liquor hydrochloric or another suitable acid or a metal salt having an acid reaction, whereby the saponaceous constituents contained in the lye are decomposed and insoluble fatty and resinous bodies are formed, and the proteine ingredient previously added is being acted upon simultaneously. The decomposition of the fatty bodies thus takes place in the ubiquitous presence of the proteine ingredient, which is likewise rendered insoluble, and is engulfing the fatty bodies as soon as separated. The presence of the proteid ingredient predisposes the decomposition of fatty bodies to become speedy and very complete on account of the insolubility of the proteid precipitation, and also on account of the basic nature of the metallic proteid compound formed. I then gently heat the liquor to cause more complete separation and afterward obtain the clear liquor by filtration or any well-known means. The metal salts I prefer to employ are aluminum, copper, iron, tin, chlorides, or sulphates, and others which may satisfy the requirements, as above explained. The heating of the treated liquor is more especially required where an acid had been employed for the decomposition of the saponaceous bodies that were contained in the lye, and may be dispensed with in some cases where metal salts had been used. To the liquor thus purified I now add soda, either caustic or carbonate of soda, so as to render the liquor very faintly alkaline, and heat to about 80° centigrade, whereby albuminous matters coagulate and fall to the bottom. Finally I boil the liquid to about 150° centigrade, thereby evaporating more water, causing the salt which is carried in the liquor to crystallize. This salt may be washed and used over again in the manufacture of soap. The first operation—namely, that of adding lime to the crude lye—may be omitted. Such omission, however, would render the treatment more expensive. I also may apply the treatment as described hereinbefore, to follow the preliminary concentration to "salting-point," to soap-lye not preliminarily so concentrated, or may go further in concentrating previous to such treatment.

I claim as my invention—

1. In the process of purifying spent soap-lye for the recovery of glycerine therefrom, the improvement which consists in first adding a suitable proteine body to the lye treated, and subsequently adding an acid or suitable metallic salt, as described.

2. In the process of recovering glycerine from spent soap-lye, the improvement which consists in first treating the lye with lime or its equivalent, removing the precipitate thus formed, next neutralizing the lye, then adding a proteine body to the lye treated, and subsequently adding an acid or suitable metallic salt to decompose and to remove soapy matters, then removing the precipitates, then adding alkali, and finally concentrating the clear liquor, as set forth.

3. In the process of recovering glycerine from spent soap-lye, the improvement which consists in first treating the lye with lime or its equivalent, removing the precipitate thus formed, next neutralizing the lye, then adding a proteine body to the lye treated, and subsequently adding an acid or suitable metallic salt to decompose and to remove soapy matters, then removing the precipitates, then adding alkali, as set forth.

4. In the process of recovering glycerine from spent soap-lye, the improvement which consists in first treating the lye with lime or its equivalent, removing the precipitate thus formed, next neutralizing the lye, then adding a proteine body to the lye treated, and subsequently adding an acid or suitable metallic salt to decompose and to remove soapy matters, as set forth.

5. In the process of recovering glycerine from spent soap-lye, the improvement which consists in neutralizing the lye, then adding a proteine body to the lye treated, and subsequently adding an acid or suitable metallic salt to decompose and to remove soapy matters, then removing the precipitates, then adding alkali, and finally concentrating the clear liquor, as set forth.

6. In the process of recovering glycerine from spent soap-lye, the improvement which consists in neutralizing the lye, then adding a proteine body to the lye treated, and subsequently adding an acid or suitable metallic salt to decompose and to remove soapy matters, then removing the precipitates, and then adding alkali, as set forth.

In testimony whereof I affix my signature in presence of two witnesses.

OTTO CHRISTIAN HAGEMANN.

Witnesses:
E. P. BITZER,
C. S. DOMER.